(12) United States Patent
Narayanaswami (10) Patent No.: US 6,678,535 B1
(45) Date of Patent: Jan. 13, 2004

(54) PERVASIVE DOCK AND ROUTER WITH COMMUNICATION PROTOCOL CONVERTER

(75) Inventor: Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 09/607,597

(22) Filed: Jun. 30, 2000

(51) Int. Cl.[7] .............................................. H04B 1/38
(52) U.S. Cl. ........................ 455/557; 455/41; 455/426; 370/466
(58) Field of Search ................................ 455/557, 556, 455/41, 517–522, 558, 41.2, 41.3, 426.1, 426.2; 370/401, 466, 338

(56) References Cited

U.S. PATENT DOCUMENTS 5,479,400 A  * 12/1995  Dilworth et al. .............. 370/60
6,404,775 B1 *  6/2002  Leslie et al. ................. 370/466
6,405,049 B2 *  6/2002  Herrod et al. ............... 455/517
6,496,107 B1 * 12/2002  Himmelstein ............... 340/426

FOREIGN PATENT DOCUMENTS

JP          11-265336      9/1999
WO       WO 99/39488     8/1999

OTHER PUBLICATIONS

"The World's Smallest PDA Computer Watch", Hammacher Schlemmer Mid Summer 2000 Catalog, p. 3.

* cited by examiner

Primary Examiner—Lee Nguyen
(74) Attorney, Agent, or Firm—Scully, Scott, Murphy & Presser; Rafael A. Perez-Pineiro (57) ABSTRACT

A communications protocol conversion system and methodology includes one or more first interface devices for receiving data signals communicated by a first communications device in accordance with a first communications protocol; a format converter device for on the fly converting the received data signals into data signals in accordance with a second communications protocol; and, one or more second interface devices for outputting the data signals in accordance with the second protocol to a second communications device. Advantageously, the protocol conversion system obviates a necessity for multiprotocol support in communications devices thereby enabling such devices to remain relatively smaller in size.

39 Claims, 8 Drawing Sheets

PERVASIVE DOCK AND ROUTER WITH COMMUNICATION PROTOCOL CONVERTER

BACKGROUND OF THE INVENTION

1. Field of the Invention

This invention relates generally to communication systems generally, and more specifically, to a pervasive dock that implements on the fly communications protocol conversion for enabling communication between a variety of devices.

2. Discussion of the Prior Art

Computing, mobile and wireless communications technologies have been rapidly advancing -culminating in a variety of powerful user friendly devices such as personal digital assistants (PDAs), cellular phones, pagers, etc. Today, it is possible to purchase handheld PDA's, e.g., palmtops-such as the Palm Pilot®, that employ wireless communication devices and that combines computing, telephone/fax, and networking features. A typical PDA may function as a cellular phone, fax sender, and personal organizer and are pen-based, requiring a stylus for text entry. As such, these device incorporate handwriting recognition features and may even employ voice recognition technologies that react to voice input. Small devices such as the RIM 950 and the Motorola PageWriter 2000 pager use a small keyboard for input.

It is commonly accepted that these pagers, PDAs and cell phone devices need to communicate among each other to increase their overall value. The proliferation of short range wireless communications technology and protocols such as IrDA (infra red), SIR (serial infra red), BlueTooth (radio 2.4 GHz), 802.11 has enabled some of these varied devices to communicate amongst themselves. A problem with these technologies is that they all have drawbacks—e.g., IrDA is only line of sight, and BlueTooth and 802.11 are largely power consumptive (about 250 mw for BlueTooth and 1 W for 802.11) for small devices such as cellular phones, pagers and watches. Lower power radio technologies such as those used in garage door openers have the problem of interference because they operate on a single frequency and do not adopt ideas such as fast frequency hopping spread spectrum techniques which avoid conflict with other devices communicating using the same wireless technology.

Today, the industry is striving to provide advancements by providing increased PC desktop-like functionality while both decreasing size and power requirements. More recently there have been attempts to incorporate some of the capabilities of the above devices into wrist watches. However, today, only special wearable watch devices are available that, besides time keeping functions, may possess a compass, or a Global Positioning System (GPS), or barometer, heart rate monitor, Personal Handy System (PHS) phone, pager, etc. There are shortcomings in these existing special function watches in that most of them are bulky, are mostly unconnected the Internet or other PC/network devices, have limited battery life, and, are difficult to use. These currently available special function wrist watches additionally have user interfaces that are quite limited in what they can display. For example, in the context of setting time in digital watches, currently, the user is only enabled to set the hour and minute independently, with time only advancing in one direction. Furthermore, most of them have a 6 to 8 seven segment LED or LCDs which can be used to display 6 or 8 digits/letters, and have a small number of indicators that can display AM/PM, Alarm on/off, etc. only at fixed locations within the display. A few watches are currently appearing on the market that have slightly richer display characteristics. Regardless, these various shortcomings have to be solved, otherwise there is no compelling reason for these watches to become popular. The design of a wrist watch for mobile computing applications offers a significant challenge because the watch is a small device. That is, both fitting components and power supplies such as batteries into such a small volume and given the limited screen size of watches pose limitations that have be overcome. Solving these issues is worthy because the watch is an attractive form as 1) it is one of the few devices that a very large fraction of the population is already accustomed to worldwide, 2) is accessible almost all the time, and, 3) is hard to lose.

It is the case however, that a single wireless technology is not sufficient for all devices, as some of these devices simply do not have room for a battery to supply the power needed by the wireless technology. Additionally, it is not clear that all devices need the same wireless range. For example if one device is on the person's wrist and another is in his/her wallet, the range needed gets reduced significantly. Further, it is impractical to embed more than one or two wireless technologies into a single device because of space and cost restrictions.

It would thus be highly desirable to provide a device that performs communication protocol conversions, and preferably, one that would accept a wireless signal from a source device and convert it on the fly to an output that is suitable for receipt by a recipient wireless device.

SUMMARY OF THE INVENTION

It is an object of the present invention to provide a device that enables efficient communication between a myriad of devices implementing various communication technologies and protocols.

It is another object of the present invention to provide a device that performs on the fly communication protocol conversion between wireless protocols.

According to the principles of the invention, there is provided a communications protocol conversion system and methodology includes one or more first interface devices for receiving data signals communicated by a first communications device in accordance with a first communications protocol; a format a converter device for converting the received data signals into data signals in accordance with a second communications protocol; and, one or more second interface devices for outputting the data signals in accordance with the second protocol to a second communications device. Preferably, the protocol conversion is performed for wireless communications protocols. Such a device preferably accepts a wireless signal from a source device and converts it to an output that is acceptable to a recipient device.

Advantageously, the myriad of communications devices implementing wireless technologies and protocols may remain small in size as not having to support several communication protocols. -Thus, the cost of these devices may be reduced as most of the cost is attributed to the communications protocol conversion system rather than into each individual wireless device.

BRIEF DESCRIPTION OF THE DRAWINGS

Further features, aspects and advantages of the apparatus and methods of the present invention will become better understood with regard to the following description, appended claims, and accompanying drawings where:

FIGS. 8(*a*) and 8(*b*) illustrates a flow chart depicting the operation of the smart pervasive dock/router of the invention.

DETAILED DESCRIPTION OF THE PREFERRED EMBODIMENTS

Figure 1:
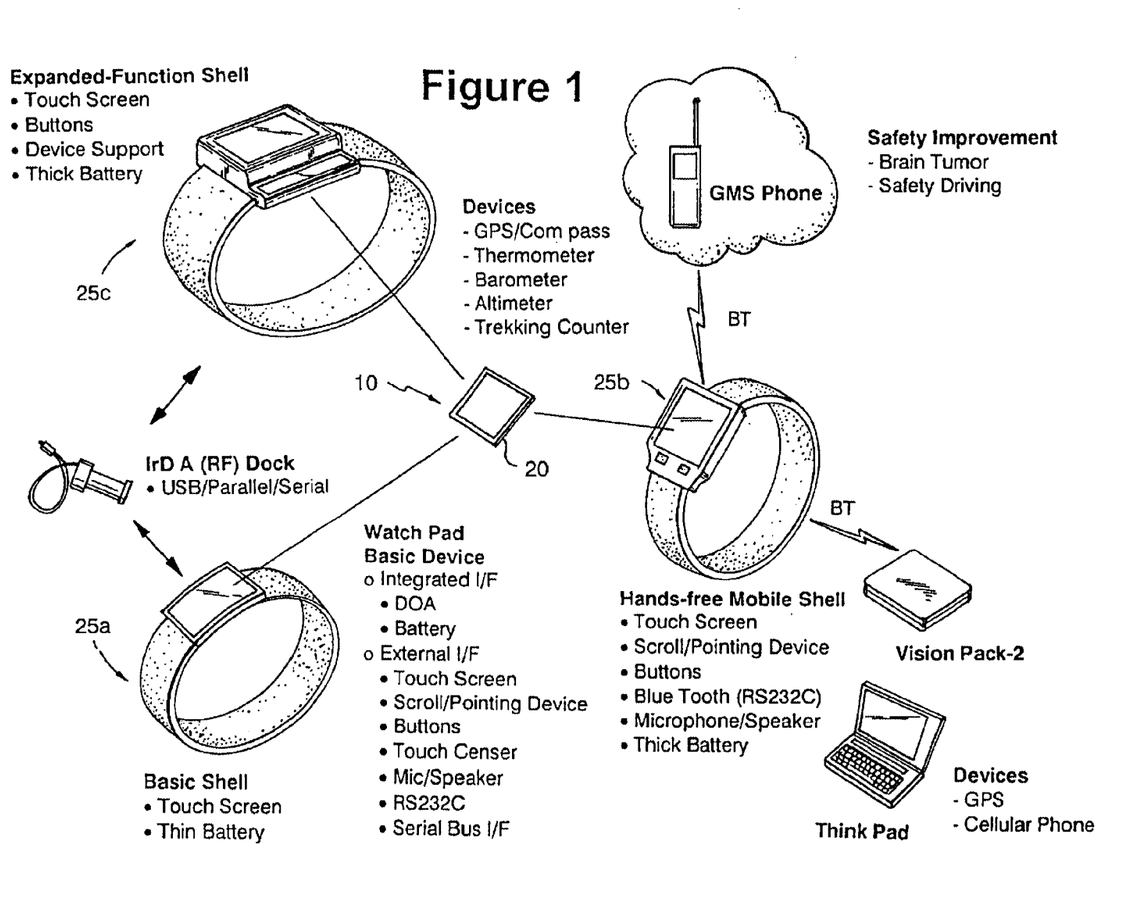
FIG. 1 illustrates conceptually the wearable information access wrist watch device of the invention.

FIG. 1 illustrates conceptually the wearable information access device for use with the present invention. Referred to herein as the "Wrist Watch device" 10, the system looks like a regular watch but is capable of receiving information from adjunct devices such as a PC, a mobile computer, other pervasive devices being carried by the user and directly from a network via a wireless communications mechanism.

As shown in FIG. 1, the Wrist Watch device 10 is based on a modular concept designed to include a motherboard or base card 20 of minimum card size that leverages state-of-the-art technologies as will be described in greater detail herein. Specifically, the base card 20 may be implemented in various types of shells 25*a*, . . , 25*c* for enabling various functions. For example, the base card 20 may be implemented in a basic shell 25*a* providing desktop like functionality via a touch screen display; a hands-free mobile shell 25*b* providing, in addition to basic desktop functionality, a communications interface with GPS and mobile phone communications capability etc., and including a touch screen display, scroll/pointing devices, and microphone and speaker devices; and an expanded function shell 25*c*, providing touch screen, buttons and support for various devices such as GPS/compass, thermometer, barometer, altimeter, etc.

Figure 2:
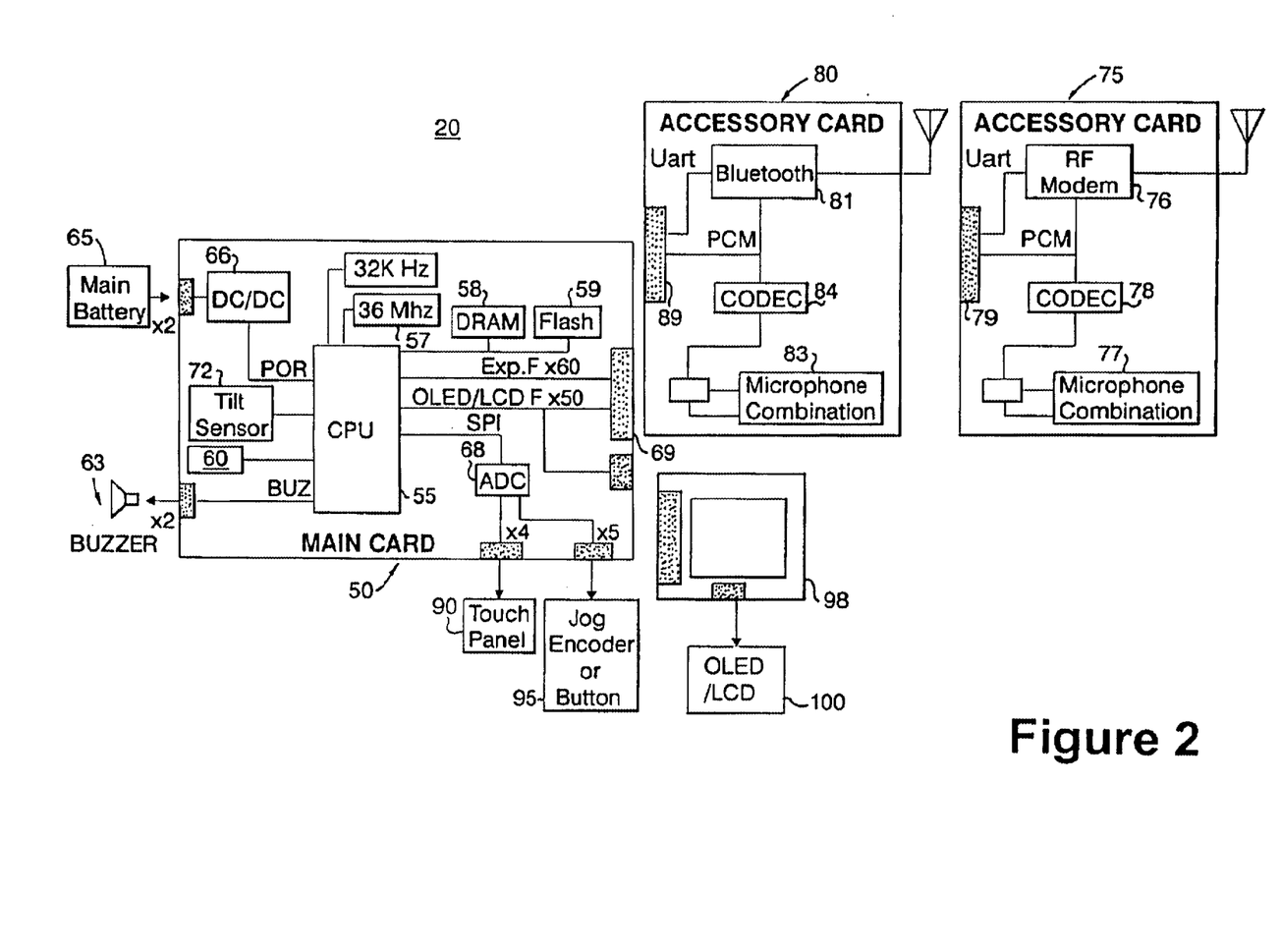
FIG. 2 is a detailed block diagram illustrating the hardware architecture of the Wrist Watch device 10 implementing the dynamic scroll device of the present invention.

FIG. 2 is a detailed block diagram illustrating the hardware architecture of the Wrist Watch system 10. As shown in FIG. 2, the base card 20 includes a first or main card 50 housing the core processing unit, I/O, and memory. For example the main card 50 includes a CPU 55, such as a Cirrus Logic CL-EP7211, which is a single-chip embedded controller functioning as a CPU for ultra-low-power applications, and armed with processing and enhanced memory management features to function equivalently as a 100 MHz Pentium. The core processing unit may operate at 2.5 V, and, to minimize the board size, may be equipped with a 3.68 MHz ceramic resonator 57 for generating the main frequency clock and timing signals. The main card 50 additionally includes sufficient nonvolatile and volatile memory including, for example, 64 Mbit EDO DRAM 58 and SRAM/Flash memory 59 that supports the system code. One communications subsystem of the Wrist Watch device 10 includes a line of sight Infrared Data Association (IrDA) communications interface having a low-power IR transceiver module 60 mounted on the card 50 for direct connection with interface decoder pins of the CPU 55 which includes an IrDA SIR protocol encoder. The first card 50 additionally includes various Analog to Digital converters (ADC), memory refresh logic and industry standard interfaces such as a compact flash interface for example, so that other devices could be attached to the Wrist Watch device 10. Other interfaces such as Universal Serial Bus (USB), and 12C, etc. may additionally be incorporated. FIG. 2 further illustrates the main card 50 as comprising power supply subsystem including a rechargeable Li-Polymer type battery 65 and a DC to DC converter 66 for supporting a wide dynamic range of Wrist Watch system/sub-system load.

With further reference to FIG. 2, the main card 50 has no audio capability but is equipped with a PCM audio interface in expansion tabs (not shown) for an accessory card, i.e., either card 75 or 80, in the expanded-shell Wrist Watch designs that support PCM audio. Particularly, the accessory card 75, 80 implemented includes a speaker and a microphone combination 77, 83 respectively, with the microphone functioning to record voice input which may be processed by the processor subsystem or stored in a storage subsystem for subsequent playback, and the speaker functioning to provide voice output, produce customized tones, and enable acoustic coupling with other listening devices, etc. As shown in FIG. 2, each speaker/microphone combination 77. 83 is connected to a respective pulse-coded modulation PCM coder/encoder devices (CODECs) 78, 84 which are controlled by a respective PCM interface 79,89 to the CPU 55. The accessory card 75, 80 is additionally equipped with various communications subsystems including low power and intermediary power radio frequency communications devices that support a Wireless Application Protocol ("WAP") used to provide communications links to mobile computers, mobile phones, portable handheld devices and, connectivity to the Internet. In one embodiment, the specific communications subsystems include circuitry for supporting BlueTooth 81 or like small-factor, low-cost radio solution circuitry, e.g., an RF-modem 76, and may include other low power radio and Flex-paging communications circuits (not shown), etc. For instance, as shown in FIG. 2, the auxiliary communication card 80 implements the BlueTooth industry standard for Radio Frequency (RF) communication, however, it is understood that other standards such as IEEE 802.11 or other RF protocols may be implemented as well. Moreover, portions of these communication protocols may be implemented on the processor on the main board 50 so that the total number of the components required is minimized. The CPU system on the main card 50 preferably employs a first Universal Asynchronous Receiver Transmitter (UART1) device (not shown) for supporting either the RF-modem 76 or Bluetooth 81 communications functionality and, may be equipped with a second UART device (UART2) providing support for data download functionality, e.g., from a PC or network server. It is understood that any like data transfer mechanism or data exchange interface device may be implemented to provide data download and RF communications support functionality.

For purposes of interacting with the device, the Wrist Watch system 10 is provided with a touch sensitive screen/panel 90 shaped within a standard watch form factor, and also a roller wheel mechanism, i.e., jog encoder 95. The touch sensitive screen enables the direct launching of applications by physical user entry of a graffiti "squiggle" in the manner such as described in commonly-owned co-pending U.S. patent application Ser. No. 09/607,596 entitled GRAFFITI BASED APPLICATION LAUNCH ON A SMART WATCH, the whole contents and disclosure of which is incorporated by reference as if fully set forth herein, and may initiate other applications/actions/events by physical touching of certain Wrist Watch display areas. In one embodiment, the touch sensitive screen panel is provided with a four (4) position touch screen. For instance, forward and back navigation for Wrist Watch displays is enabled by physically touching certain areas of the touch sensitive panel. The roller wheel mechanism 95 may be rolled up or down (i.e., clockwise or anticlockwise) to simulate a display cursor scrolling function for text and graphics, and specifically generates signals that are A/D converted for receipt by the processor to enable movement of the Wrist Watch display cursor, and more particularly, movement of an arrow cursor or other displayed indicators providing appointment update and browsing functions. Preferably, when the wheel mechanism moves by more than a predetermined amount, e.g., 20° degrees, the wheel generates a signal as a mouse device would when rolled. If a user rolls the wheel continuously, the wheel generates a signal for every 20 degrees of rotation (hereinafter "rotation event(s)"), with the event generated including an indication specifying whether the wheel was turned clockwise or anticlockwise. In this manner, the direction of the roller wheel, and consequently, the direction of cursor movement through a particular display, is tracked by the processor. The roller wheel mechanism-additionally may be pushed or depressed to generate a signal (hereinafter "wheel click event(s)"), akin to a keypress or mouse click event, for activating a selected application, hyperlink or a menu item. In one embodiment, the roller wheel device may comprise a bezel which may be rotated and depressed for generating both rotation and wheel click events in the manner such as described in commonly-owned co-pending U.S. patent application Ser. No. 09/607, 594 entitled BEZEL BASED INPUT MECHANISM AND USER INTERFACE FOR A SMART WATCH, the whole contents and disclosure of which is incorporated by reference as if fully set forth herein. It is understood that other types of scroll device may be implemented to provide cursor movement, e.g., a slider. Moreover, a standard button may be implemented for providing selection functions.

As further shown in FIG. 2, various Analog to Digital converters (ADC) 68 support an interface with the touch screen display panel 90, and an interface with the jog encoder or button for the roller wheel mechanism 95. An interface 69 is provided for a unit 98 housing a high resolution (VGA equivalent) emissive Organic Light Emitting Diode (OLED) high contrast display 100. Further, the main card 50 for the basic shell interfaces to a buzzer 63 controlled directly by the CPU 55 using its buzzer interface and timer counters. To detect the posture of the watch, a mechanical four-way tilt sensor 72.is further provided comprising mechanical switches (for detecting degree of tilt) producing signals which may be detected by the CPU. This sensor may be used for the various purposes such as power management, display control, etc. In a preferred embodiment, additional sensors may be attached to the Wrist Watch device over an interface. Examples may include additional tilt and motion (velocity, direction, speed) sensors, environment sensors such as thermal sensors, pressure sensors, health monitoring sensors such as blood pressure, etc. The Wrist Watch accordingly provides the display for the sensor and may also analyze the data collected from the sensors.

With more particularity, the high contrast display 100 of FIG. 2 does not need a backlight to make the display visible. Thus, the power consumed by the display is proportional to the number of pixels that are turned on in the display. Since the pixels preferably comprise light emitting diodes, the display is automatically visible at night and a user does not need to press any buttons to see the display. Moreover, the OLED display 100 may be viewed clearly at a wide variety of angles with the brightness of these displays being controlled by limiting the amount of current supplied to the diodes. In one embodiment, the OLED chip 100 is a high-resolution pixel addressable display, e.g., 640×480, for enabling the display of various textual and graphical items on the watch face, similar to what may be displayed on a computer screen or a Palm Pilot®. For example, the time may be represented by drawing the hour and minute hands on a watchface display. Further, the hands of the watchface display may be erased when, at some other time, a display of a photograph is desired to be displayed.

Figure 3:
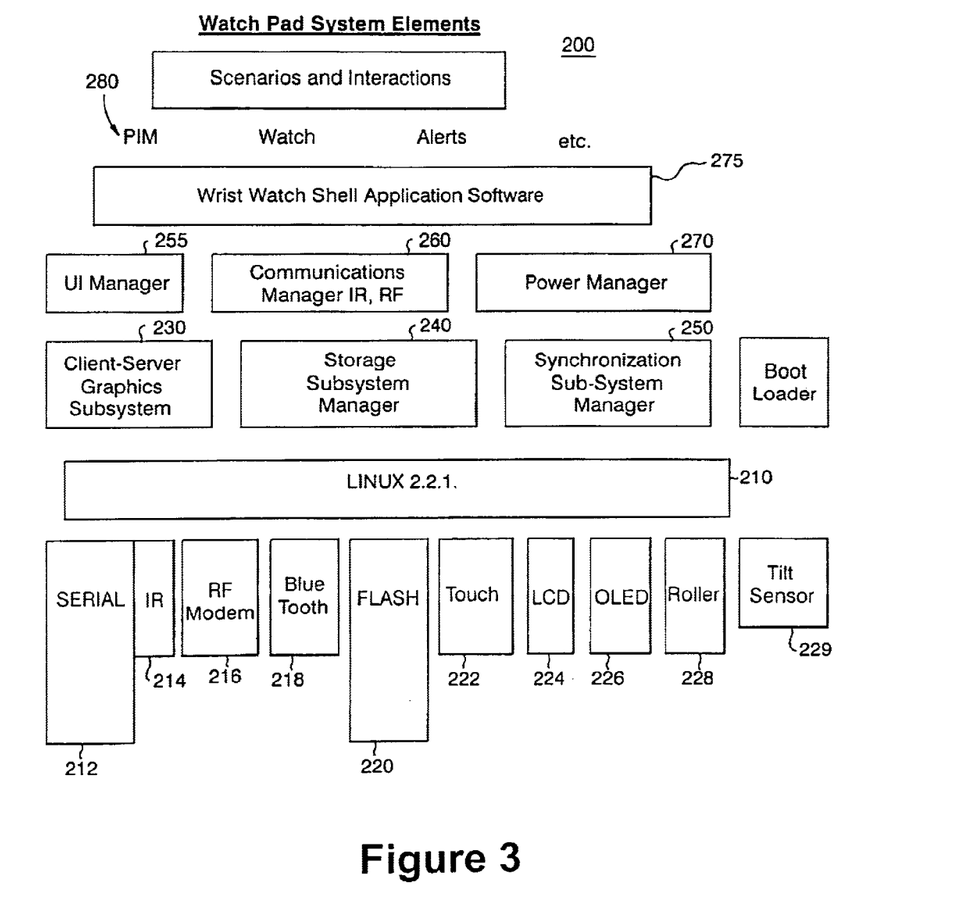
FIG. 3 illustrates the software architecture 200 for the Wrist Watch device 10.

FIG. 3 illustrates the software architecture 200 for the Wrist Watch device 10. At its lowest level, the Wrist Watch system runs an operating system 210, e.g., LINUX 2.2.1, that permits multiple user level and kernel level threads to run and will support multitasking and multi-user support. Device drivers are provided for each input/output subsystem will handle low level device dependent code and interfaces so that higher level Application Programming Interfaces (APIs) can be implemented on top of them. The device drivers provided for each input/output subsystem include a serial I/O system driver 212, IrDA system driver 214, RF-Modem subsystem driver 216, Bluetooth system driver 218, flash memory 220, touch screen subsystem driver 222, LCD subsystem driver 224, OLED subsystem driver.226, roller wheel subsystem driver 228 and tilt sensor device driver 229. A client-server graphics subsystem 230, storage subsystem manager 240 and synchronization sub-system manager 250 is provided on top of the device drivers for receiving and transmitting I/O events between the applications, updating of the screen, etc. A graphics library is available for the application writer so that custom screens may be displayed. A user interface manager 255 is provided to process events received from user input devices such as the roller wheel, bezel (i.e., jog encoder) and touch panel for the appropriate applications. A communication subsystem manager 260 is provided to handle events from communication channels and pass the events to the right application to set things up for data transfers to proceed. In accordance with the principles of the invention, the synchronization manager 250 is provided to synchronize data transfer between the Wrist Watch device and the other devices. Particularly, it receives the data from the communication channel and operates in conjunction with the right application to decode the sent data and update the data for the application receiving the data. An example of this would be an update to a calendar event. A system wide power manager 270 is provided to monitor and control power consumption on the device and communicate with other subsystems such as the operating system scheduler to optimize the battery life of the device. The power manager 270, for example, measures the power left in the battery, estimates the power required to run an application, and recommends what subsystems need to be shut down as the battery starts draining out.

Figure 4:
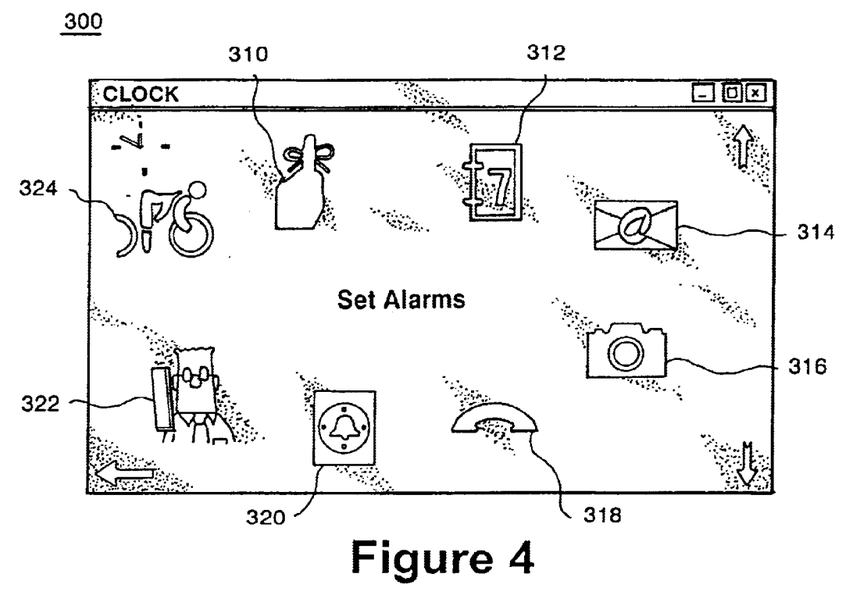
FIGS. 4 and 5 illustrate example OLED system displays 300 and 400 providing respective menu ring of selectable icons for launching Personal Information Management applications provided in the Wrist Watch device.
Figure 5:
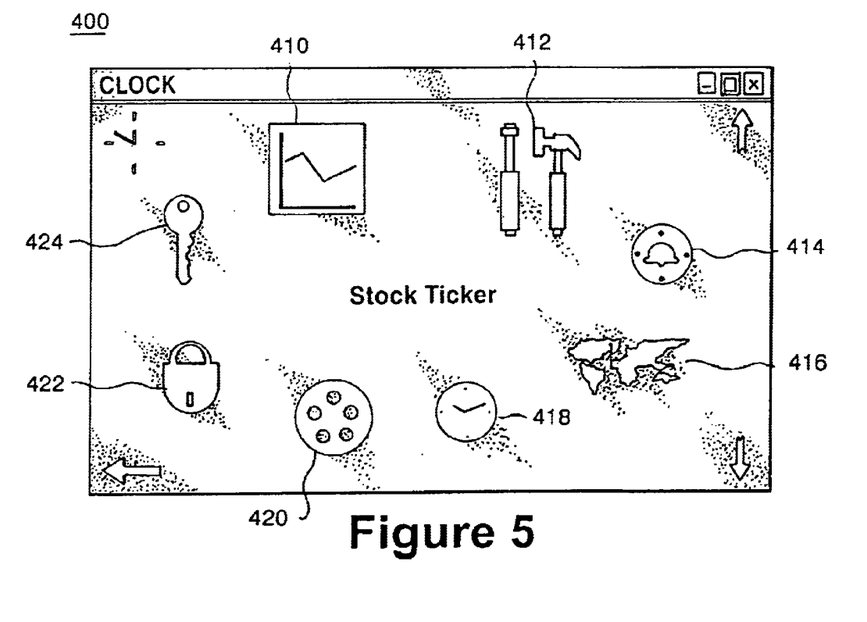

As further shown in FIG. 3, the Wrist Watch device 10 is equipped with Wrist Watch shell application software 275 provided on top of the basic graphics, communication and synchronization subsystems. One key application supported is the microbrowser which enables access to a WAP-supporting Web site and receives Web-based communications written in, for example, the Wireless Markup Language ("WML") using the XML standard. WML particularly is designed to optimize Internet text data for delivery over limited-bandwidth wireless networks and onto small device screens, and particularly, is devised to support navigation with limited input mechanisms, e.g., buttons. Details regarding the implementation of WML in the Wrist Watch device may be found in commonly-owned, co-pending U.S. Patent Application No. 09/608,042 entitled SYSTEM AND METHOD EMPLOYING WML ANNOTATIONS FOR USER INTERFACE CONTROL OF A WEARABLE APPLIANCE the contents and disclosure of which is incorporated by reference as if fully set forth herein. Other supported applications include Personal Information Management (PIM) applications software 280. FIG. 4 illustrates an example system display 300 providing a main menu 302 comprising selectable icons for launching the following PIM applications: an icon 310 for launching an application directed to displaying/maintaining "to do" lists, an icon 312 for launching an application directed to displaying/maintaining calendars and appointments, an icon 314 for launching an application directed to retrieving/storing/displaying e-mail messages, an icon 316 for launching an application directed to retrieving/storing/displaying digital photographs and bit-mapped images, an icon 318 for launching an application directed to retrieving/storing/displaying phone lists, an icon 320 for launching an application directed to setting of time and alarms which is shown highlighted, an icon 322 for launching an application directed to retrieving/storing/displaying comic images such as Dilbert® United Feature Syndicate, Inc., and, an icon 324 for launching an application directed to providing stop watch and elapsed time features. FIG. 5 illustrates a second example system display 400 providing a main menu 402 comprising a menu ring of selectable icons for launching other PIM applications including: an icon 410 for launching an application directed to retrieving stock quotes from the world wide web and displaying/maintaining a stock ticker shown highlighted in the display, an icon 412 for launching an application directed to retrieving/storing/displaying Wrist Watch display tools, an icon 414 for launching an application directed to retrieving/storing/displaying set various alarms, an icon 416 for launching an application directed to retrieving/storing/displaying world time zone information, an icon 418 for launching an application directed to setting of the watchface clock, an icon 420 for launching an application directed to retrieving/storing/displaying games, an icon 422 for launching an application directed to providing security features, and, an icon 424 for launching an application directed to storing and displaying user passwords, key locations, and other sensitive data and subject matter that needs to be remembered. Inter-device interaction software applications are included to permit the watch display to become the display for another device such as a GPS located in a concealed location, (e.g., a bag), or a thermostat on the wall, etc.. Thus, this application software enables communication between the other device and the Wrist Watch by receiving/displaying the data and transmitting back information sent from the Wrist Watch. As a further example, caller Id information may be displayed on the Wrist Watch display when the cell phone that belongs to that person rings. Typically, multiple persons are congregated in a room and carry their cell phones in a hand bag or wear them on their belts, have a hard time determining which cell phone is ringing when a ringing tone is heard in a room. This results in every person in the room pulling out his/her cell phone out of their handbag or belt to check if it is the one that is ringing. The caller Id display feature of the Wrist Watch device is particularly advantageous as each wearer may simply glance at the watch and would immediately know if the ringing phone belonged to him/her, in addition, to determining who the calling party is facilitating the decision of whether or not he/she should answer the phone. In a further example, this application software may allow the data from the Wrist Watch storage subsystem 240 to be viewed on another device such as on a PDA, PC, and other community viewing devices. In the preferred embodiment, middleware such as Tcl/Tk, Javascript, Perl, or the like etc., may run on top of the operating system, graphics and communication manager APIs for facilitating rapid development of these applications on the Wrist Watch device 10.

The present invention is directed to an adjunct device that functions in cooperation with the Wrist Watch 10 for converting one communication protocol into another. Referred to herein as the "smart pervasive dock", it additionally possesses the ability to transcode data as well. The smart pervasive dock device of the invention thus is dedicated to converting communication protocols, advantageously permitting a manufacturer of the device to implement just one communication protocol while letting the user generate communications in accordance with other communication protocols via the pervasive dock device. Devices thus may remain small by not having to support several communication protocols.

Figure 6:
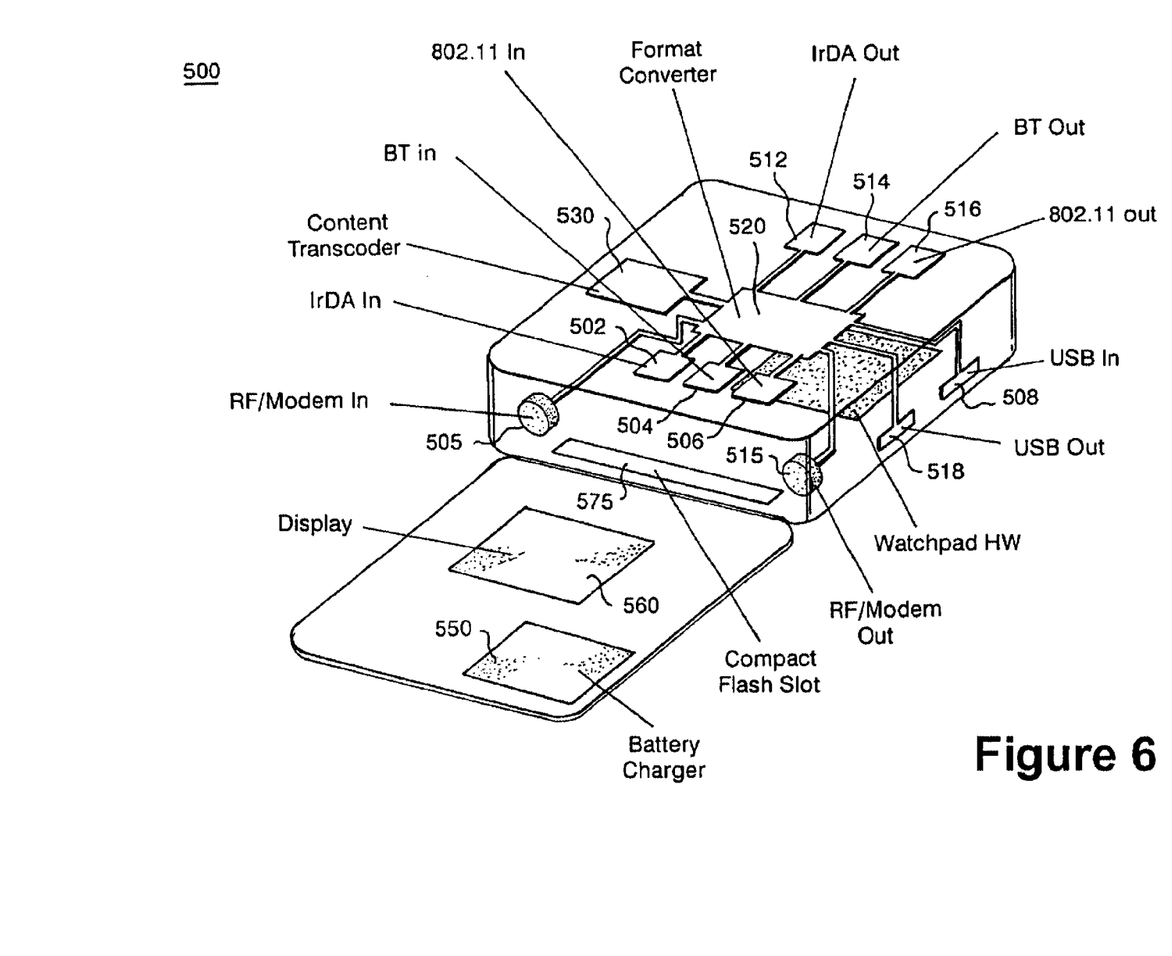
FIG. 6 is a block diagram illustrating the smart pervasive dock/router 500 for performing on the fly communication protocol conversion according to a preferred embodiment of the invention.

FIG. 6 is a block diagram illustrating the smart pervasive dock 500 according to the preferred embodiment of the invention. Generally, the smart pervasive dock 500 includes a plurality of communications devices for receiving data signals in accordance with a respective communications protocol. In the embodiment shown in FIG. 6, the plurality of communications receiver devices include, but are not limited to: a first device 502 for receiving signals generated in accordance with IrDA protocol; a device 504 for receiving signals generated in accordance with the BlueTooth wireless communications protocol; a device 505 for receiving RF modem signals; a device 506 for receiving signals generated in accordance with the IEEE 802.11 or like RF wireless communications protocol; and, a device 508 for receiving signals generated in accordance with the universal serial bus (USB) protocol. The smart pervasive dock 500 additionally includes communications devices for generating data signals for transmission over another communication channel in accordance with a communications protocol. In the embodiment shown in FIG. 6, the plurality of communications transmitter devices include, but are not limited to: a device 512 for outputting signals in accordance with the IrDA protocol; a device 514 for outputting signals in accordance with the BlueTooth wireless communications protocol; a device 515 for outputting RF modem signals; a device 516 for outputting signals in accordance with the IEEE 802.11 or like RF wireless communications protocol; and, a device 518 for outputting signals in accordance with the USB protocol. It is understood that other communications protocol interface devices may be included in the smart pervasive dock. One such other protocol may include IEEE Firewire.

In the preferred embodiment, the smart pervasive dock shown in FIG. 6 includes a format converter device 520 that comprises the necessary software, protocol specific logic, general purpose CPU, memory and storage buffers to convert communications in one protocol to another protocol. That is, each of the protocol receiver devices 502–508 and each of the protocol output devices 512–518 interface with the format converter 520. Although not shown, each input and output communication protocol is user selectable, for example, by knobs buttons or like suitable mechanism. Preferably, the format converter device is self configuring whereby, during an initial registration process, an initial start up message will be generated to enable the dock to select the output protocol. Further, in the preferred embodiment, the communication protocol conversion is accomplished by software executing in the CPU. This allows fine tuning of the conversion mechanism so that it can adapt to the actual rate at which the date is being sent. Buffers (not shown) are necessary to match the different data rates on the input side from that on the output side. When the buffers become dangerously close to being completely full, the sender of the data will be notified so that the sender may slow down and wait for the buffer to be drained. The format converter 520 will send acknowledgments back to the sender so that the sender may send more data and will also receive acknowledgments from the receiver so that it knows whether it received all the data correctly. It is understood that standard existing mechanisms may be implemented for error correction and retransmission. Furthermore, as a device optimization for reducing CPU load on the dock/router, and in order to address the situation where a receiving device is turned off, the buffer devices may be equipped for storing messages received from a first device, e.g., device A, in accordance with a first protocol, for later transmission to a second device, e.g., device B, in accordance with a second protocol. This later time may be included in the header of the message sent from device A, or be decided by the dock. It is understood that the buffers on the dock/router are large enough to hold the message. Thus, at the start of such a message transfer, the dock may check the message header to find its total length and determine if it can hold the message. The device may additionally comprise a decompression unit (not shown) so that it may accept compressed data and uncompress the data if necessary before sending to the sender in case the sender does not have the ability to understand the compressed data.

In the preferred embodiment, the smart pervasive dock supports multiple simultaneous communications, such that, a two devices, A and B, may communicate via the dock while, simultaneously, two other devices, C and D, may communicate via the dock at the same time.

In an example, a cell phone may provide a Blue Tooth interface. The smart pervasive dock 500 receives this Blue Tooth data via the BlueTooth "in" port 504, implements the format converter 520 for converting the received data into a form data suitable for transmission via the IrDA protocol. The format converter 520 then transmits this data over an IrDA link 512. A PDA device equipped with an IrDA transceiver may then receive this data over the IrDA channel. Thus, a device without a Blue Tooth receiver may receive data from a device having a Blue Tooth transmitter via the smart pervasive dock protocol adapter 500. Furthermore, a device that cannot support a power consumptive Blue Tooth interface may still interact with data sent from a device that does support the Blue Tooth interface.

In another example, the smart pervasive dock protocol adapter of the invention may be used to receive data from his/her PC such as communicated via BlueTooth, and download the data to the Wrist Watch device via the RF modem card. The smart pervasive dock protocol adapter of the invention functions as an intermediary device which functions to receive the BlueTooth communications from the PC, do the appropriate buffering and storing, and then convert that data stream into an RF modem-based data stream for transmission via the RF modem port to the Wrist Watch device 10.

As a further example, two devices that support IrDA protocol but are mutually hidden may still communicate with the smart pervasive dock/router protocol adapter provided the communication adapter is visible (within the line of sight) of both IrDA supported devices. The ceiling of a room, thus may be an optimum location for mounting the smart pervasive dock protocol adapter as several points are visible from the vantage point in the ceiling.

According to a further aspect of the invention, the smart pervasive dock protocol adapter 500 is equipped with a content transcoder device 530 for transcoding received data content on the fly. Thus, if the input to the device is a web page designed for viewing on a PC, but the output is intended for receipt by a small handheld device with a smaller screen, then transcoder device software may convert the web page into a format more suitable for viewing on the smaller handheld device, e.g., by converting color images to gray scale images, or changing the resolution of the images so that they fit on the smaller device, etc. In general, the transcoder device 530 of the smart pervasive dock protocol adapter 500 device will be notified of the characteristics of the communicating input and output devices so that additional optimizations/conversions may be performed. For this purpose, it may be necessary to equip the transcoder device 530 with a more powerful CPU, however, the overall cost to the user is reduced as only this CPU is required in one converter device as opposed to each individual device. As an example use of the content transcoder device 530, a device that sends a huge web page or a huge e-mail message that is eventually destined for receipt by the Wrist Watch device, will be intercepted by the transcoder device 530 and would format the data so as to transmit a summary, e.g., just the e-mail subject line and/or the first hundred characters of the web page or e-mail message.

Furthermore, if the message had an attachment, the transcoder device 530 would prevent its further transmission if the data is being sent to a smaller Wrist Watch device. In accordance with the Wrist Watch device implemented for receiving WML formatted documents as described in the above-referenced co-pending U.S. patent application Ser. No. 09/608,042, the transcoder device 530 may implement mechanisms for generating WML documents from larger received HTML/XML or other markup language web pages for example.

As further shown in FIG. 6, the smart pervasive dock 500 may be additionally equipped with a compact flash slot 575 or PCMCI slot for receiving communication card plug-ins. Thus, in an example alternative embodiment, an RF modem may be built into the compact flash card for implementing the RF modem functionality via suitable buffer and bus connections to the CPU (not shown). The smart pervasive dock protocol adapter 500 may provide additional functionality such as voltage conversion and, for example, may include a built in battery charger 550 for enabling more continuous operation. A display 560 may be optionally provided.

Figure 7:
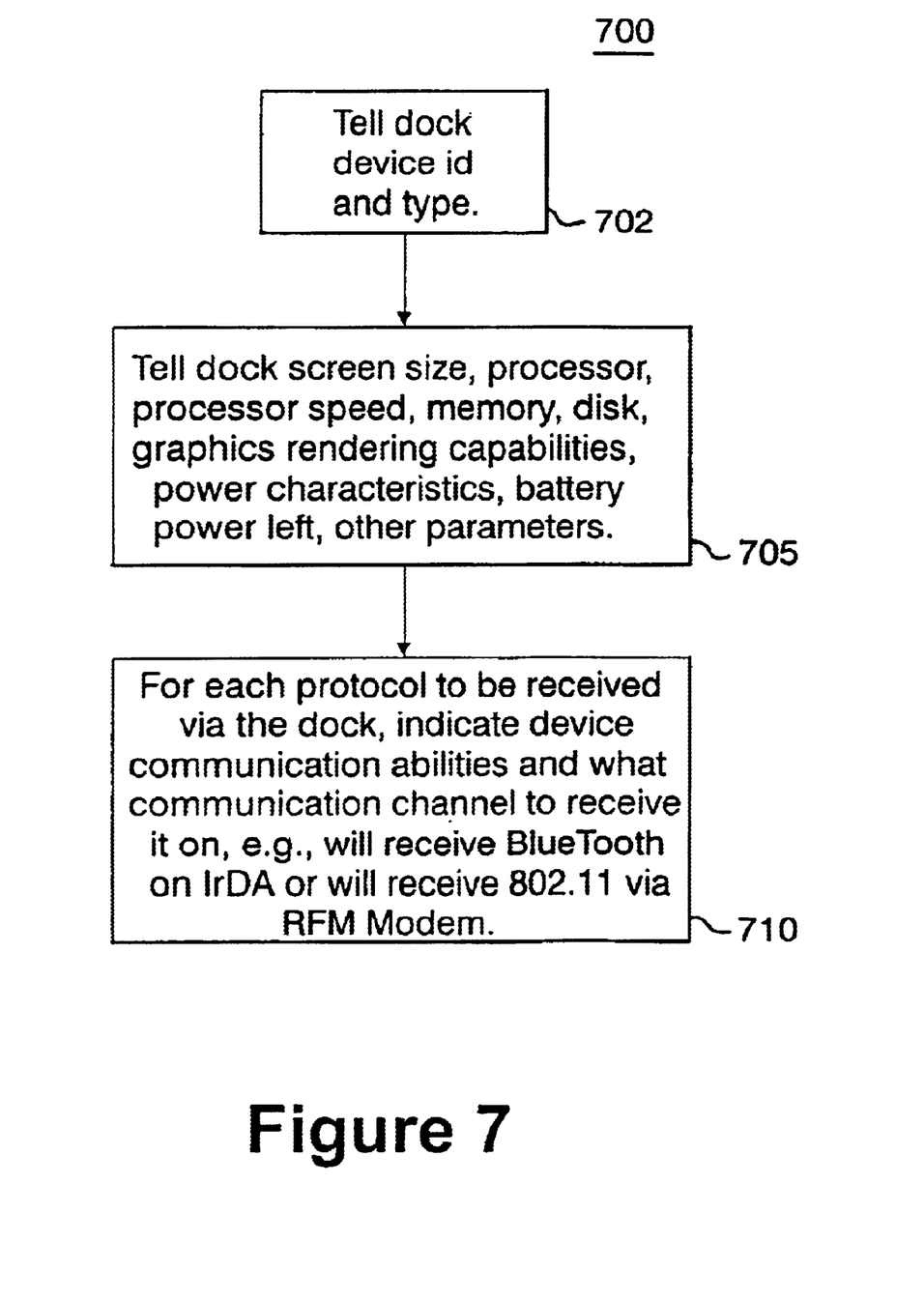
FIG. 7 is a flow chart diagram illustrating the registration process for registering a device with the smart pervasive dock/router so that the dock may receive data on its behalf.

FIG. 7 is a flow chart diagram illustrating the registration process 600 for registering a receiving device with the smart pervasive dock/router so that the dock may receive data on its behalf. In a first step 702 the device must communicate the device id and the type of receiving device to the smart pervasive dock/router, and, further at step 705, parameters of the receiving device such as the screen size, processor, processor speed, memory, disk, graphics, rendering capabilities, power characteristics, battery power left and other parameters. At a further step 710 there is communicated to the smart pervasive dock/router the communication protocol to be received via the dock including the communications abilities of the receiving device and communications channel that the receiving device is to receive the communication on. Based on the registered information, the smart pervasive dock/router operates in accordance with a continuous process thread 725 as depicted in FIGS. 8(a) and 8(b).

Figure 8A:
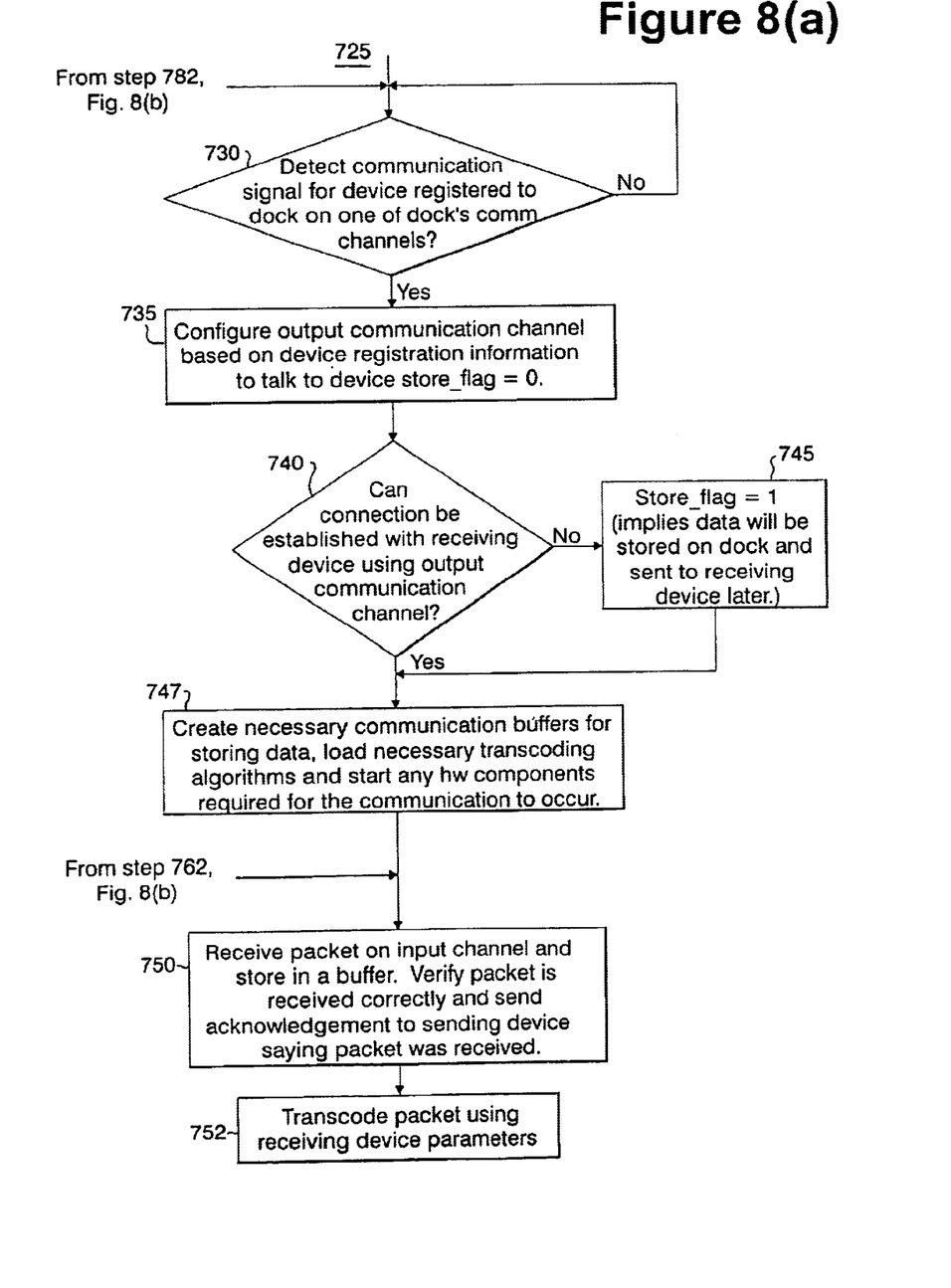

As shown in FIG. 8(a), at a first step 730, the smart pervasive dock/router is programmed to continuously detect communication signals for the device registered to dock on one of the dock's communications channels. Based on the device registration information, the dock configures an output communication channel for talking to the receiving device as indicated at step 735. At this step, a store_flag is initialized for indicating whether data is to be stored on the dock for later delivery. At step 740, a determination is made as to whether the dock can establish communication with the receiving device utilizing the configured output channel. If communication can not be established with the device, then the process proceeds to step 745 where the store_flag is set to imply that the data to be communicated is to be stored within the dock for later delivery. If communication can be established with the device, then at step 747 the dock/router allocates the necessary communication buffers for storing data, and will load the necessary transcoding algorithms and power up and program any hardware components required for the communication. As indicated at step 750, the dock then begins to receive the communications from the sending device via an input channel for storage in the allocated buffers. It is understood that for every packet that is communicated, an acknowledgment verifying correct receipt of the packet is communicated to the sending device. Furthermore, at step 752, the packet may be further transcoded in accordance with the parameters of the receiving device as received during registration process (FIG. 7). Continuing to FIG. 8(b) the smart pervasive dock/router converts the received packet to the specified output protocol and adds any necessary headers, error control codes, packet information, etc.

Figure 8B:
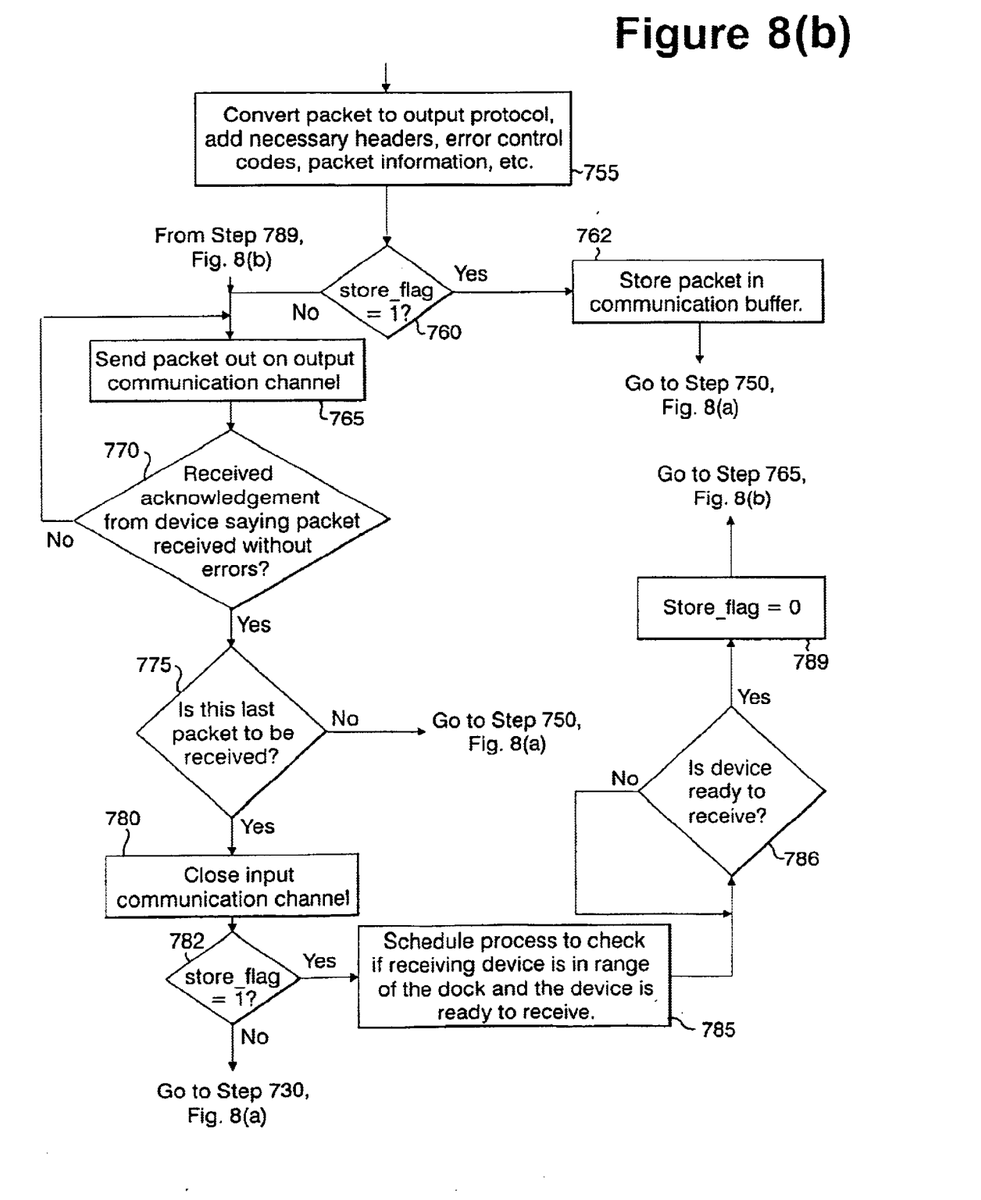

Proceeding to step 760, FIG. 8(b), a determination is made as to whether the store_flag has been set to indicate that the data is to be stored within the dock until such time as the receiving device is ready to receive communications. If the store_flag has been set, then the received packet is stored in the dock's communication buffer at step 762 and the process returns to step 750, FIG. 8(a) to receive the next packet on the input channel. If at step 760 the store_flag has not been set, then the process proceeds to step 765 where the packet is sent out on the output communication channel. Then, at step 770, a determination is made as to whether the dock has receive an acknowledgment from the receiving device indicating that the packet had been received without errors. If the dock did not receive such acknowledgment, then the process returns to step 765 where the packet is retransmitted. If the dock did receive the acknowledgment, then at step 775, a determination is made as to whether the packet was the last packet to be received by the sending device. If the packet is not the last packet to be received, then the process returns to step 750, FIG. 8(a) to receive the next packet on the input channel. If, on the other hand, the packet is the last packet to be received, then the input communication channel is closed at step 780, and at step 782, a determination is made as to whether the store_flag has been set to indicate that the data is to be stored within the dock. If the store_flag has not been set, then the process returns to step 730, FIG. 8(a) for detection of further communications. If however, the store_flag has been set, then, at steps 785, 786 a process is initiated by the smart pervasive dock/router to periodically check whether the receiving device is in the range of the dock and is ready to receive packet communications. At step 786, once it is determined that the receiving device is ready to receive the packets, then the store_flag is reset at step 789 and the process returns to step 765 for communicating the packets to the device.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A protocol converter device for communications systems comprising:
   one or more first interface devices for receiving data packets communicated by a first device capable of transmitting data packets according to a first communications protocol;
   a format converter device for converting said received data packets into data packets suitable for transmission in accordance with a second communications protocol; and,
   one or more second interface devices for outputting said data packets in accordance with said second protocol to a second device capable of receiving said data packets transmitted according to said second communications protocol,
   means for receiving parameters relating to communication and data processing capabilities of said second device in advance of receiving communications from first devices, to enable conversion of communications received in a first data format from said first devices to data formats supported by said second device according to said received parameters;
   whereby said protocol converter device obviates a necessity for multiprotocol support in said first and second devices and permits multiple simultaneous communications between pairs of first and second devices according to different communications protocols and data formats.

2. The protocol converter as claimed in claim 1, wherein one or more said first and second interface devices supports receipt and output of data signals according to a wireless communications protocol.

3. The protocol converter as claimed in claim 1, wherein a first and second communications protocol includes an Infrared Data Association (IrDA) communications protocol.

4. The protocol converter as claimed in claim 1, wherein a first and second communications protocol includes a BlueTooth radio frequency (RF) communications standard.

5. The protocol converter as claimed in claim 1, wherein a first and second communications protocol includes an IEEE 802.11 communications standard.

6. The protocol converter as claimed in claim 1, wherein a first and second communications protocol includes a Universal Serial Bus communications protocol.

7. The protocol converter as claimed in claim 1, wherein a first and second communications protocol includes an IEEE Firewire communications protocol.

8. The protocol converter as claimed in claim 1, wherein a first and second interface device supports an RF-modem communications standard.

9. The protocol converter as claimed in claim 1, further comprising a content transcoder device for converting data content received in a first format as transmitted from said first communications device to data content in a second format for output to said second communications device incapable of supporting said first data content format.

10. The protocol converter as claimed in claim 9, wherein said second communications device includes a wearable wrist watch device implementing a wireless data receiver device for receiving wireless communications, said content transcoder device converting a first data content format comprising hypertext mark-up language format to a second data content format comprising a wireless mark-up language for receipt by said wearable wrist watch device.

11. The protocol converter as claimed in claim 1, further comprising mechanism for selecting a first interface device for receiving data signals in accordance with a first communications protocol and for selecting a second interface device for outputting data signals in accordance with a second communications protocol.

12. The protocol converter as claimed in claim 1, further comprising a buffer device for storing a message associated with received data signals from a first device prior to outputting said message to a second device.

13. The protocol converter as claimed in claim 1, further comprising mechanism for performing power conversion, whereby data signals received in accordance with a first power level are converted into output signals in accordance with a second power level.

14. A method for data protocol conversion comprising the steps of:
receiving parameters relating to communication and data processing capabilities of a second device in advance of receiving communications from a first device;
receiving data packets communicated in accordance with a first communications protocol and transmitted by said first device;
converting said received data packets into data packets suitable for transmission in accordance with a second communications protocol, said step further converting communications received in a first data format from a first device to data formats supported by a second device according to said received prameters; and,
transmitting said converted data packets in accordance with said second protocol for receipt by a second device,
whereby said protocol converter device obviates a necessity for multiprotocol support in said first and second communications devices and permits multiple simultaneous communications between pairs of first and second devices according to different communications protocols and data formats.

15. The method as claimed in claim 14, wherein one or more said first and second interface devices supports receipt and output of data signals according to a wireless communications protocol.

16. The method as claimed in claim 14, wherein a first and second communications protocol includes an Infrared Data Association (IrDA) communications protocol.

17. The method as claimed in claim 14, wherein a first and second communications protocol includes a BlueTooth radio frequency (RF) communications standard.

18. The method as claimed in claim 14, wherein a first and second communications protocol includes an IEEE 802.11 communications standard.

19. The method as claimed in claim 14, wherein a first and second communications protocol includes a Universal Serial Bus communications protocol.

20. The method as claimed in claim 14, wherein a first and second communications protocol includes an IEEE Firewire communications protocol.

21. The method as claimed in claim 14, wherein a first and second interface device supports an RF-modem communications standard.

22. The method as claimed in claim 14, further comprising the step of converting data content received in a first format as transmitted from said first communications device to data content in a second format for output to said second communications device incapable of supporting said first data content format.

23. The method as claimed in claim 22, wherein said second communications device includes a wearable wrist watch device implementing a wireless data receiver device for receiving wireless communications, said converting step including converting a first data content format comprising hypertext mark-up language format to a second data content format comprising a wireless mark-up language for receipt by said wearable wrist watch device.

24. The method as claimed in claim 14, further comprising the steps of:
receiving an input signal representing a user selection of a first interface device for receiving data signals in accordance with a first communications protocol; and
receiving an input signal representing a user selection of a second interface device for outputting data signals in accordance with a second communications protocol.

25. The method as claimed in claim 14, further comprising the step of:
storing a message associated with received data signals from a first device prior to outputting said message to a second device.

26. The method as claimed in claim 14, further comprising the step of performing power conversion, whereby data signals received in accordance with a first power level are converted into output signals in accordance with a second power level.

27. A program storage device readable by a machine, tangibly embodying a program of instructions executable by the machine to perform method steps for data protocol conversion, said method steps including the steps of:
receiving parameters relating to communication and data processing capabilities of a second device in advance of receiving communications from a first device;
receiving data packets communicated in accordance with a first communications protocol and transmitted by a first device;
converting said received data packets into data packets suitable for transmission in accordance with a second communications protocol, said step further converting communications received in a first data format from a first device to data formats supported by a second device according to said received parameters; and,
transmitting said converted data packets in accordance with said second protocol for receipt by a second device, whereby said protocol converter device obviates a necessity for multiprotocol support in said first and second devices and permits multiple simultaneous communications between pairs of first and second devices according to different communications protocols.

28. The program storage device readable by a machine as claimed in claim 27, wherein one or more said first and second interface devices supports receipt and output of data signals according to a wireless communications protocol.

29. The program storage device readable by a machine as claimed in claim 27, wherein a first and second communications protocol includes an Infrared Data Association (IrDA) communications protocol.

30. The program storage device readable by a machine as claimed in claim 27, wherein a first and second communications protocol includes a BlueTooth radio frequency (RF) communications standard.

31. The program storage device readable by a machine as claimed in claim 27, wherein a first and second communications protocol includes an IEEE 802.11 communications standard.

32. The program storage device readable by a machine as claimed in claim 27, wherein a first and second communications protocol includes a Universal Serial Bus communications protocol.

33. The program storage device readable by a machine as claimed in claim 27, wherein a first and second communications protocol includes an IEEE Firewire communications protocol.

34. The program storage device readable by a machine as claimed in claim 27, wherein a first and second interface device supports an RF-modem communications standard.

35. The program storage device readable by a machine as claimed in claim 27, further comprising the step of converting data content received in a first format as transmitted from said first communications device to data content in a second format for output to said second communications device incapable of supporting said first data content format.

36. The program storage device readable by a machine as claimed in claim 35, wherein said second communications device includes a wearable wrist watch device implementing a wireless data receiver device for receiving wireless communications, said converting step including converting a first data content format comprising hypertext mark-up language format to a second data content format comprising a wireless mark-up language for receipt by said wearable wrist watch device.

37. The program storage device readable by a machine as claimed in claim 27, wherein said method steps further include the steps of:

receiving an input signal representing a user selection of a first interface device for receiving data signals in accordance with a first communications protocol; and receiving an input signal representing a user selection of a second interface device for outputting data signals in accordance with a second communications protocol.

38. The method as claimed in claim 27, wherein said method step further includes the step: storing a message associated with received data signals from a first device prior to outputting said message to a second device.

39. The program storage device readable by a machine as claimed in claim 27, wherein said method steps further include the step of performing power conversion, whereby data packets received in accordance with a first power level are converted into output data packets in accordance with a second power level.

* * * * *